United States Patent [19]

Sholtz

[11] Patent Number: 5,299,616

[45] Date of Patent: Apr. 5, 1994

[54] SCREEN FOR USE WITH A VEHICLE WINDOW

[76] Inventor: Steve J. Sholtz, 347 Laird, Mt. Morris, Mich. 48458

[21] Appl. No.: 94,263

[22] Filed: Jul. 21, 1993

[51] Int. Cl.$^5$ ............................................... E06B 3/32
[52] U.S. Cl. ...................................... 160/89; 160/105; 296/146.16
[58] Field of Search ................. 180/89, 180, 116, 105, 180/370.2 R, 371; 296/146.16

[56] References Cited

U.S. PATENT DOCUMENTS

| | | | |
|---|---|---|---|
| 2,245,931 | 6/1941 | Meyer | 160/89 X |
| 3,288,200 | 11/1966 | Gagne | 160/180 |
| 3,670,798 | 6/1972 | Hess et al. | 160/105 X |
| 4,285,383 | 8/1981 | Steenbugh | 160/105 X |

Primary Examiner—Blair M. Johnson
Attorney, Agent, or Firm—Gifford, Groh, Sprinkle, Patmore and Anderson

[57] ABSTRACT

A screen for use with a vehicle window. The screen has a screen portion and a surrounding frame. The frame is secured by securing means along the edge of a vehicle window frame interiorly of the vehicle window. The window is hingedly attached along one edge to a side of the vehicle. An engaging arm mechanism is provided and is pivotal to actuate the window from a closed to an open position. An aperture is provided in the screen to permit passage therethrough by the arm mechanism. A flexible material is attached over the screen aperture and is secured between the pivoting arm and the window. The arm mechanism pivots open the window from within the flexible material so that the opening created by the aperture is covered.

5 Claims, 2 Drawing Sheets

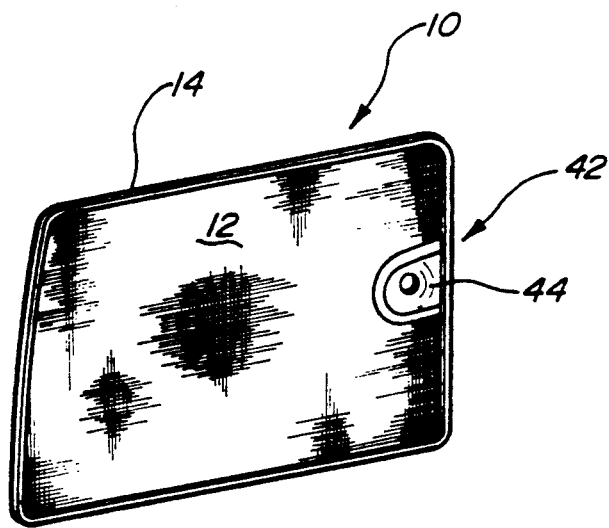
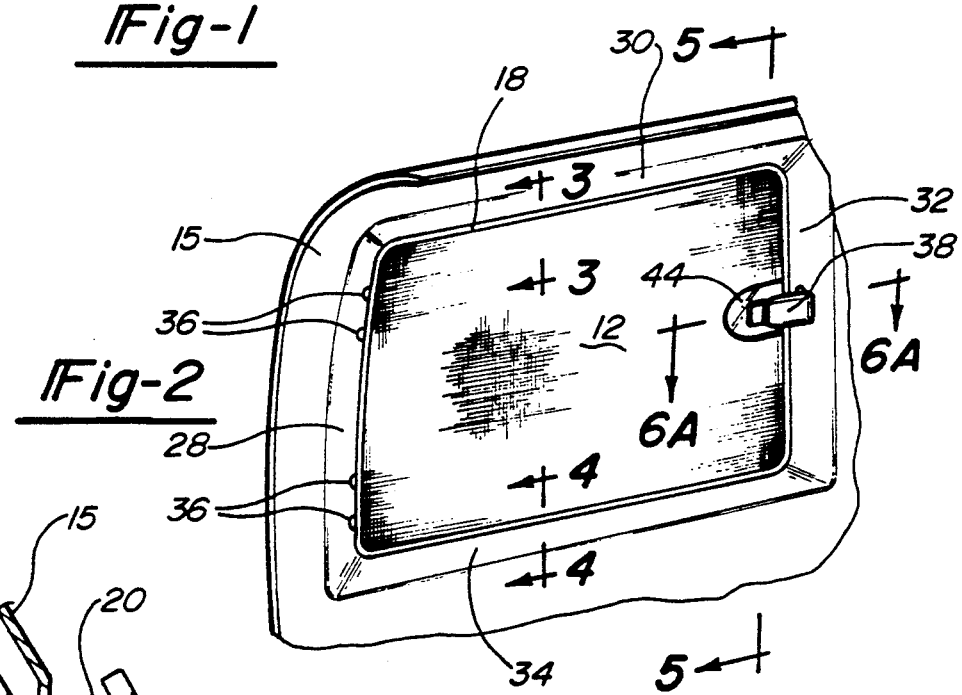
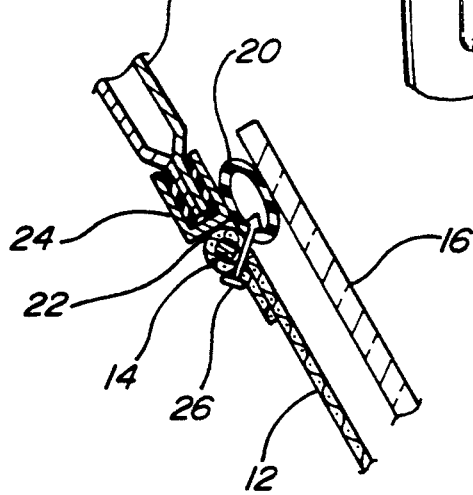
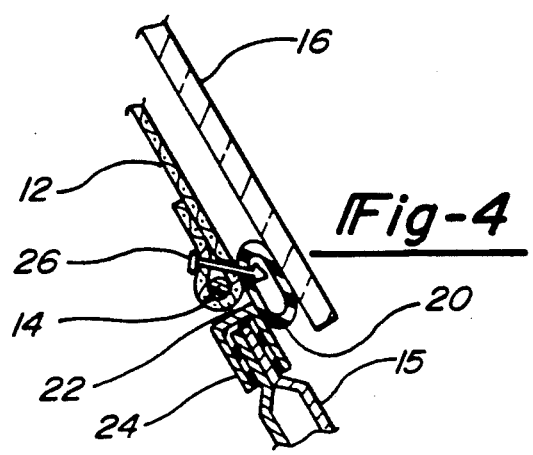

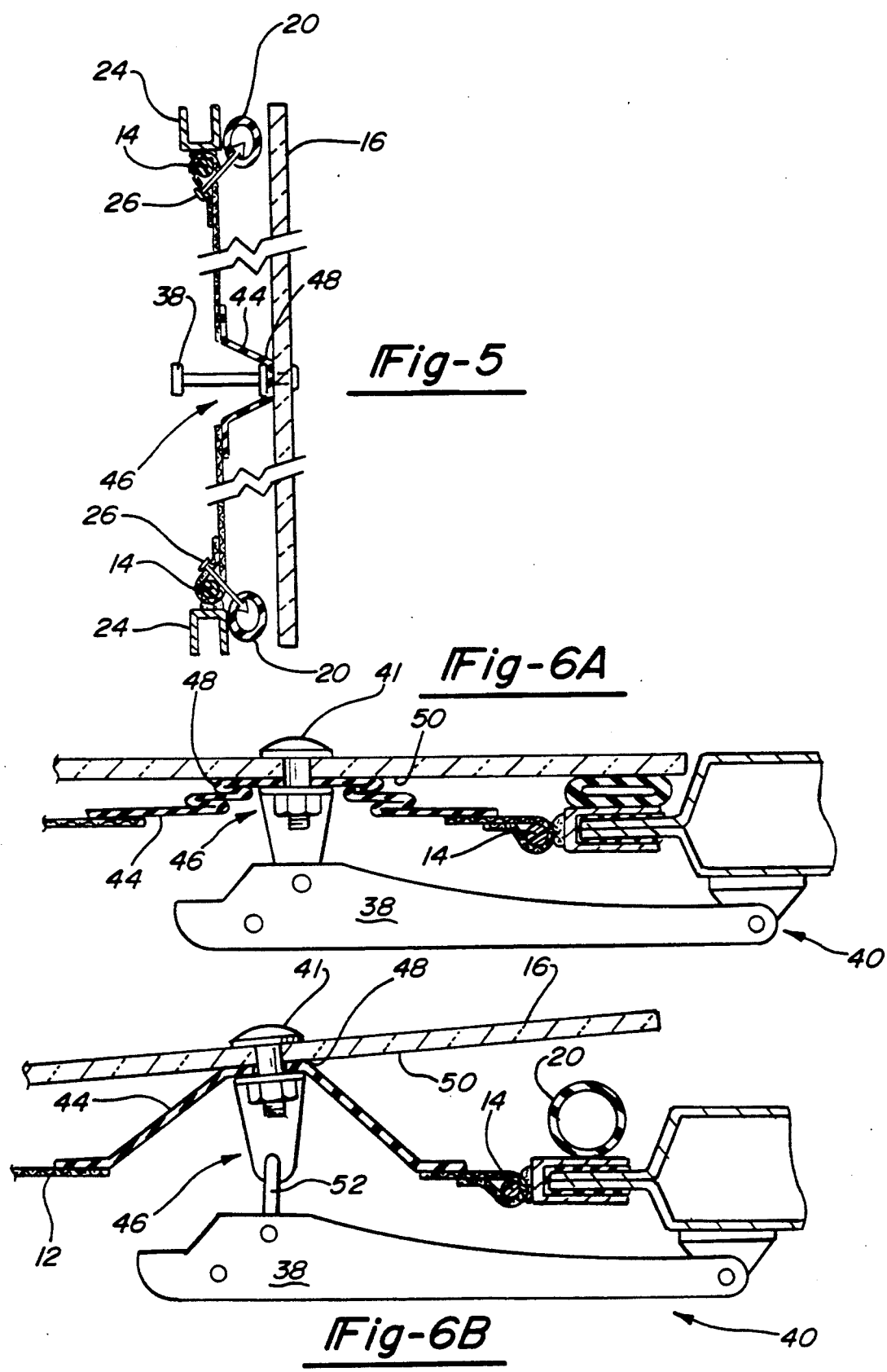

SCREEN FOR USE WITH A VEHICLE WINDOW

FIELD OF THE INVENTION

The present invention relates to a screen for use with a motor vehicle window and, more particularly, to a screen for use with a hingedly connected vehicle window which permits an engaging arm mechanism inside the vehicle to pivotally open the window exteriorly of the screen.

DESCRIPTION OF THE PRIOR ART

Window screens for motor vehicles are known in the art. U.S. Pat. No. 4,285,383, issued to Steenburgh, discloses an adjustable vehicle screen. The screen utilizes a telescoping frame for accommodating window openings in motor vehicles.

Similarly, U.S. Pat. No. 3,670,798, issued to Hess et al., teaches a vehicle screen with flexible attachment means. The attachment means are fitted around the upper, forward and rear portions of the door and secure the screen in place when the door is engaged with the door jam.

Finally, U.S. Pat. No. 3,288,200, issued to Gagne, teaches a window screen which may be mounted to cover the inside of the window to permit the window to be opened and closed with the screen in place.

Gagne appears similar to the present invention however, upon closer review, exhibits a number of shortcomings. First of all, the window screen in Gagne appears to be of a larger dimension than the window opening. Further, Gagne employs a very complicated mechanism for opening the window exteriorly of the screen. A manually operable toggle device can pivot the window outwardly only after a sliding door which covers the window is slid out of the way. The door must then be replaced in order to seal the opening.

Accordingly, none of the existing references teach a screen assembly for use with a vehicle window which permits the window to be pivoted open exteriorly of the screen without the necessity of manual operation.

The vehicle window screens of the prior art also cannot be used in combination with a flip-out window for a vehicle such as the currently popular mini-van. These windows are usually hingedly connected at one end to the vehicle and are pivoted outwardly at the other end by an engaging arm mechanism.

SUMMARY OF THE INVENTION

The present invention is a screen for use with a vehicle window. The screen has a screen portion surrounded by a frame. The frame is secured within the vehicle adjacent to and interiorly of the vehicle window. An aperture is created in the screen by a recess formed in the frame along one edge and adjacent to the overlaying window. An engaging arm mechanism is secured at one end to the vehicle and extends through the screen aperture to secure at the other end to the vehicle window. A flexible material is secured to the edge of the frame surrounding the aperture and provides an intermediate connection between the arm mechanism and the window. The flexible material therefore seals the aperture and is flexible to permit the arm mechanism to open and close the window.

BRIEF DESCRIPTION OF THE DRAWING

A better understanding of the present invention will become apparent upon reference to the accompanying drawings wherein like reference numbers refer to like characters and in which:

FIG. 1 is a frontal view of the screen of the present invention;

FIG. 2 is a view similar to that shown in FIG. 1, and showing the screen of the present invention mounted in a vehicle window;

FIG. 3 is a cross-section taken along line 3—3 in FIG. 2 and showing a first sealing edge between the vehicle gasket and the screen of the present invention;

FIG. 4 is a cross-section taken along line 4—4 in FIG. 2 and showing a second sealing edge between the vehicle gasket and the screen of the present invention;

FIG. 5 is a cross-section taken along line 5—5 of FIG. 2 and showing the window being pivoted outwardly a predetermined distance exterior the screen of the present invention;

FIG. 6a is a cross section taken along line 6—6 of FIG. 2 and showing the pivoting arm mechanism in a first closed position; and FIG. 6b is a view similar to that shown in FIG. 6a and showing the pivoting arm mechanism in a second open position.

DESCRIPTION OF THE PREFERRED EMBODIMENT

Referring to FIG. 1, there is shown a screen 10 for use with a window of a motor vehicle. The screen 10 has a screen portion 12 which is surrounded by a frame 14. The screen portion 12 is constructed of a metallic mesh material such as is commonly known in the art. However, other materials can be used for the screen portion 12. The frame 14 is constructed of a durable and flexible material such as a polymer or a light weight metal.

Referring to FIGS. 2-4, the frame 14 is secured within a vehicle 15 adjacent to an existing vehicle window 16. In a preferred embodiment, the frame 14 is secured by adhesive means along its outer edge to an existing gasket 18 which surrounds the vehicle window and which sealingly engages the edges of the window 16 when the window 16 is closed. Alternatively, the frame 14 may be attached by screws or other means known in the art (not shown) to the motor vehicle so as to be a predetermined distance from the vehicle window.

FIGS. 3 and 4 show upper and lower sealing edges, respectively between the screen 12 of the invention and the gasket 20. The window 16 is shown in a closed position in both FIGS. 3 and 4. The frame 14 surrounding the screen 12 is attached, preferably by an adhesive 22 to brackets 24. The brackets 24 form part of the vehicle interior and secure the frame 14 in place. Additionally, a pair of pins 26 may be used to secure the frame 14 to the gasket 20 at the upper and lower sealing edges.

The vehicle window 16 most commonly used with the screen of the present invention is a side window of the currently popular mini-van. The windows are customarily located on opposite sides of the mini-van near the rear of the vehicle or in the rear doors. For purposes of this disclosure, only one side of the vehicle is illustrated. The window customarily has four edges, numbered 28, 30, 32 and 34, as shown in FIG. 2. The window is hingedly mounted along its first edge 28 by a pair of hinges 36 to the side of the vehicle.

Referring again to FIG. 2 and to FIGS. 5, 6a and 6b, an engaging arm mechanism 38 is mounted by hinge 40 means to an inside support of the vehicle and to the vehicle window 16 by a bolt and thread arrangement 41. The arm mechanism 38 is pivotally mounted so as to connect to the vehicle window close to its edge 32 and to open the window about its hinges 36 along edge 28.

Referring again to FIGS. 1 and 2, the screen is provided with an aperture 42 to permit passage of the arm mechanism 38 therethrough. The aperture 42 is created by a recess in the frame 14 along edge 32. The aperture 42 is located in the screen 10 so that the arm mechanism 38 will pass through the space defined by the aperture 42 and will pivotally open the vehicle window 16 when the screen 10 is mounted to the window assembly of the vehicle. A flexible material 44 is secured over the area defining the aperture 42. In a preferred embodiment, the flexible material 44 is of a conical or semi-spherical shape and is constructed of a rubberized or like material.

Referring again to FIGS. 6a and 6b, the flexible material 44 has an open base 46 and a tip 48. The base 46 of the material 42 is secured to the screen 12. The tip 48 is likewise connected by the bolt and screw 41 to an inner surface 50 of the glass window 16 through the flexible material 44.

In operation, the vehicle window is in a first closed position (FIG. 6a) when a pivot arm 52 the engaging arm mechanism is retracted. The arm mechanism may then be actuated to pivot the window outwardly, to the position shown in FIG. 6b. The window may then be closed by the actuating arm in the same manner in which it is opened. The flexible material is both constructed and dimensioned so as not to stress the frame or screen of the vehicle to the point where it may deform or the securing means between the flexible material and the frame such that the wire mesh may be damaged.

Accordingly, the screen of the present invention enables the exteriorly-positioned vehicle window to be pivotally opened by an engaging arm mechanism mounted to an inside of the vehicle. This can normally be accomplished by the driver of the vehicle while operating the vehicle. Thus, when the window is open, the flexible material covers the open space of the aperture and prevents insects or other outside matter from entering the vehicle through the screen.

Having described my invention, further embodiments beyond those disclosed herein will become apparent to one skilled in the art.

I claim:

1. A screen for use with a vehicle window, said vehicle window being pivoted from a closed position to an open position by an engaging arm mechanism, said screen comprising:

a screen portion;

a frame surrounding said screen portion, said frame being secured by securing means adjacent to and interiorly of said vehicle window;

an aperture formed in said screen portion at a location in which said arm mechanism pivotally opens said window; and a flexible material secured to the screen to cover said aperture;

wherein said flexible material is secured between said arm mechanism and said window and permits said arm mechanism to actuate said window to said open position while at the same time covering the open space defined by said aperture.

2. The screen as disclosed in claim 1, wherein said flexible material is cone-shaped with a first end being a base of said cone secured to said screen and a second end being a tip of said cone.

3. The screen as disclosed in claim 2, wherein said tip of said flexible material is secured to said vehicle window at said second end.

4. The screen as disclosed in claim 1, wherein said arm mechanism is secured to a support of a motor vehicle in proximity to said vehicle window so as to actuate said window to said open position.

5. The screen as disclosed in claim 4, wherein said vehicle window is hingedly attached to said motor vehicle along a first edge opposite from a second edge where said engaging arm mechanism pivots said window.

* * * * *